United States Patent
Bossard

(10) Patent No.: US 8,299,134 B1
(45) Date of Patent: *Oct. 30, 2012

(54) SYSTEM AND METHOD FOR PROCESSING NATURAL GAS

(76) Inventor: Peter R. Bossard, Ivyland, PA (US)

( * ) Notice: Subject to any disclaimer, the term of this patent is extended or adjusted under 35 U.S.C. 154(b) by 372 days.

This patent is subject to a terminal disclaimer.

(21) Appl. No.: 12/647,455

(22) Filed: Dec. 26, 2009

Related U.S. Application Data

(63) Continuation-in-part of application No. 12/182,541, filed on Jul. 30, 2008, now Pat. No. 8,105,402.

(51) Int. Cl.
*C07C 27/00* (2006.01)

(52) U.S. Cl. ........ 518/706; 518/700; 518/702; 518/703; 518/704

(58) Field of Classification Search .......... 518/700–704, 518/706
See application file for complete search history.

(56) References Cited

U.S. PATENT DOCUMENTS 8,105,402 B1 * 1/2012 Bossard ............ 48/197 R

* cited by examiner

*Primary Examiner* — Jafar Parsa
(74) *Attorney, Agent, or Firm* — LaMorte & Associates, P.C.

(57) ABSTRACT

A system and method for converting the natural gas into liquid hydrocarbons. A plurality of reaction cells are provided. Each reaction cell contains two concentric tubes. The concentric tubes are close in diameter and therefore create a very narrow uniform gap space in between the concentric tubes. The outer most of the tubes is heated. Natural gas and steam are passed into the gap space of at least some of the reaction cells. Due to the confinement of the gases and the heat, the mixture undergoes a water gas shift reaction to produce syngas. The syngas can then be reintroduced into other reaction cells to induce the Fischer-Tropsch process. Accordingly, the syngas is converted into complex hydrocarbons and water. The hydrocarbons and water are separated and cooled into liquid. The water is recycled and the liquid hydrocarbons are stored and transported.

18 Claims, 3 Drawing Sheets

_US 8,299,134 B1_

SYSTEM AND METHOD FOR PROCESSING NATURAL GAS

RELATED APPLICATION

This application is a continuation-in-part of U.S. patent application Ser. No. 12/182,541, entitled Micro-Channel Steam Reformer And System For Extracting Ultra-Pure Hydrogen Gas From A Hydrocarbon Fuel, filed Jul. 30, 2008 now U.S. Pat. No. 8,105,402.

BACKGROUND OF THE INVENTION

1. Field of the Invention

In general, the present invention relates to systems and methods that are used in the steam reformation of natural gas to produce syngas and then react the syngas to form a liquid hydrocarbon. More particularly, the present invention is related to systems and methods that react natural gas into syngas and react syngas into liquid hydrocarbons using the Fischer-Tropsch process.

2. Prior Art Description

Natural gas is a widely abundant natural resource that exists in deposits underground and under the oceans around the world. However, natural gas is not used directly from a well. Natural gas must first be processed to remove contaminant gases and other impurities that are mixed within the natural gas. The natural gas must then be introduced into the natural gas pipeline infrastructure so that it can be utilized by commercial and private customers. As such, natural gas obtained from wells must be transported to processing centers.

The concentration of natural gas varies greatly from deposit to deposit. If a natural gas deposit is very large, the value of the natural gas that can be obtained justifies the cost of transporting that gas to a processing center. Such transportation is typically accomplished by building a pipeline from the gas wells to a processing center. If a pipeline is unavailable or impractical, the natural gas is pumped into storage tanks and is then transported using rail cars, trucks and/or ships.

Natural gas is mostly methane, which is a very light gas. Consequently, a small amount of natural gas takes up a large volume of space. In order to transport the natural gas more efficiently, the natural gas can be compressed into compressed natural gas (CNG) or liquefied into liquid natural gas (LNG). The equipment needed to compress or liquefy natural gas is very complex, very large and extremely expensive. As a result, such equipment is used sparingly and is typically used only at the most productive and profitable wells.

For every highly productive natural gas well that is drilled, there are many nominally productive wells drilled. A nominally productive well produces useful amounts of natural gas. However, due to the location of the gas well and/or the volume of gas produced by the gas well, it is not cost effective to harvest the natural gas and transport that natural gas to a processing center.

A great need therefore exits for a system and method that can be used to convert natural gas into a liquid form at the site of a nominally productive well in a manner that is low cost and space efficient. If this need is met, natural gas can be collected from nominally productive wells in a cost efficient manner, therein greatly increasing the natural gas supply available for use. This need is met by the present invention as described and claimed below.

SUMMARY OF THE INVENTION

The present invention is a system and method for processing natural gas, therein converting the natural gas into liquid hydrocarbons that are easier to transport than is natural gas.

A plurality of reaction cells are provided. Each reaction cell contains two concentric tubes. The concentric tubes are close in diameter and therefore create a very narrow uniform gap space in between the concentric tubes. The outer most of the tubes is heated. The heat conducts through the outer tube to heat the gap space between the two concentric tubes.

Natural gas and steam are combined into a mixture. The mixture is passed into the gap space of at least some of the reaction cells. Due to the confinement of the gases and the heat, the mixture undergoes a water gas shift reaction to produce syngas. The reaction can be assisted by the presence of a catalyst in the gap space.

The syngas can then be reintroduced into other reaction cells. The catalyst in these reaction cells is different to induce the Fischer-Tropsch process. Accordingly, the syngas is converted into complex hydrocarbons and water. The hydrocarbons and water are separated and cooled into liquid. The water is recycled and the liquid hydrocarbons are stored and transported.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and method can be used to condition methane gas from a variety of sources, such as biogas sources, garbage dump ventilation wells and the like, the present invention is particularly well suited for conditioning gas emanating from a natural gas well. Accordingly, the present invention system and method will be described in use at a natural gas well in order to set forth the best mode contemplated for the invention. The illustrated embodiment, however, is merely exemplary and should not be considered a limitation when interpreting the scope of the appended claims.

Figure 1:
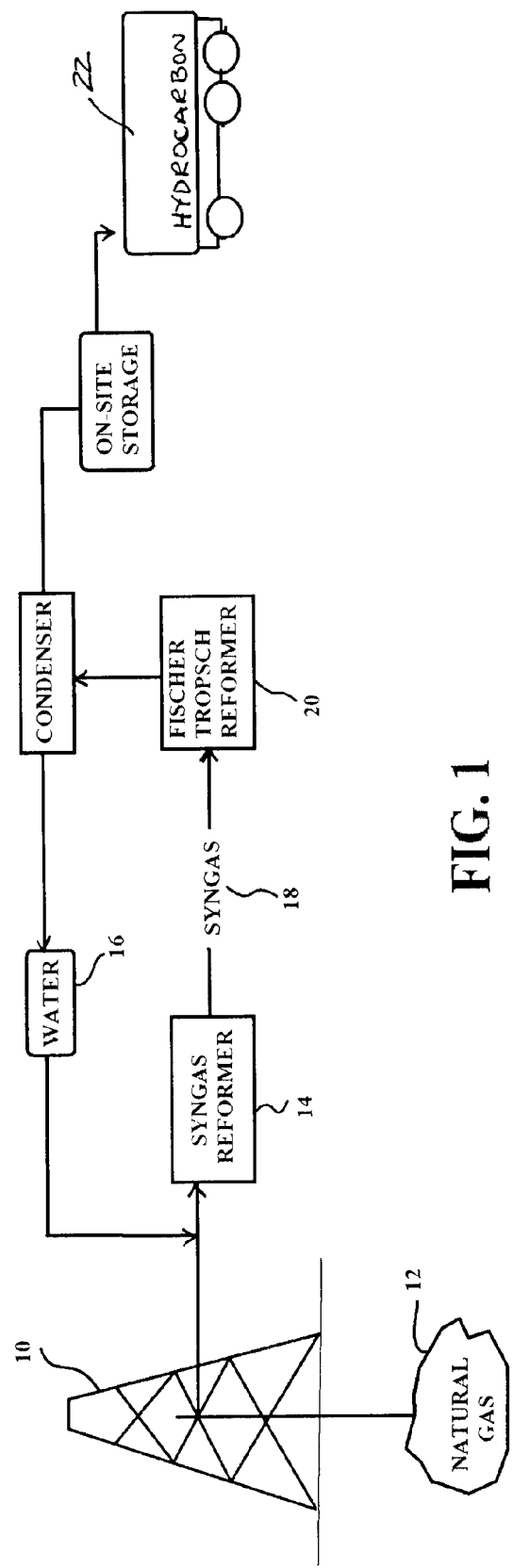
FIG. 1 is a schematic of a natural gas processing system using a natural gas well and a natural gas source.

Referring to FIG. 1, a schematic of the overall system and method is shown. Natural gas 12 is obtained from a well 10. The natural gas 12 is liquefied on-site so that the natural gas 12 can be inexpensively transported from the site of a well 10 to a processing center. The equipment used to liquefy the natural gas 12 has been greatly simplified and reduced in size. Accordingly, the equipment needed to liquefy the natural gas 12 can be brought on-site to most any gas well 10.

The natural gas 12 is not converted into liquid natural gas (LNG) using traditional compression and cooling techniques. Rather, the natural gas 12 is converted into a liquid hydrocarbon using a two-step conversion process. In the first step, the natural gas 12 is directly piped from the well 10 into a syngas reformer 14. In the syngas reformer 14, the natural gas 12 is reacted with water 16 utilizing a water gas shift reaction.

Natural gas 12 is mostly methane (CH$_4$). In a water gas shift reaction, the methane is reacted with water to produce carbon monoxide (CO) and hydrogen gas (H$_2$) using the reaction of Equation 1 below:

$$CH_4 + H_2O = CO + 3H_2$$

The reactant gases (CO+H$_2$) are commonly referred to as syngas 18 in the art.

The syngas 18 is subjected to the second step of the conversion process. In the second step, the syngas 18 is sent through a Fischer-Tropsch reformer 20 where the syngas 18 is converted into a liquid hydrocarbon. The Fischer-Tropsch reformer 20 subjects the syngas 18 to a catalyzed chemical reaction. In that reaction, the components of the syngas 18, namely CO and H2, are recombined into more complex hydrocarbons. The reactions of the Fischer-Tropsch reformer 20 are shown by Equation 2 below:

$$(2n+1)H_2 + nCO = CnH(2n=2) + nH_2O$$

where n is a positive integer. The catalyst selected for the reaction favors the formation of higher hydrocarbons that can be stored in liquid form at or near ambient conditions. A variety of catalysts can be used within the Fischer-Tropsch reformer 20. The most common are the transition metals cobalt, iron, and ruthenium. Nickel can also be used, but tends to favor methane formation. In addition to the active metals, the catalysts typically contain a number of promoters, including potassium and copper, as well as high-surface-area binders/supports such as silica, alumina, or zeolites.

Unlike the other metals used for this process (Co, Ni, Ru) which remain in the metallic state during synthesis, iron catalysts tend to form a number of chemical phases, including various iron oxides and iron carbides during the reaction. Control of these phase transformations can be important in maintaining catalytic activity and preventing breakdown of the catalyst particles.

Using the Fischer-Tropsch reformer 20, the syngas 18 is transformed into propane, butane and/or more complex hydrocarbons 22. The hydrocarbon 22 is then stored in liquid form. The liquid hydrocarbon 22 can then be pumped into a railway car or tanker truck and taken to a traditional processing station for further purification.

The Fischer-Tropsch reformer 20 produces water 16 as well as higher hydrocarbons. The water 16 is stored and is used by the syngas reformer 14, which reacts water 16 with the natural gas 12. As a result, water 16 is recycled by the overall system.

Figure 2:
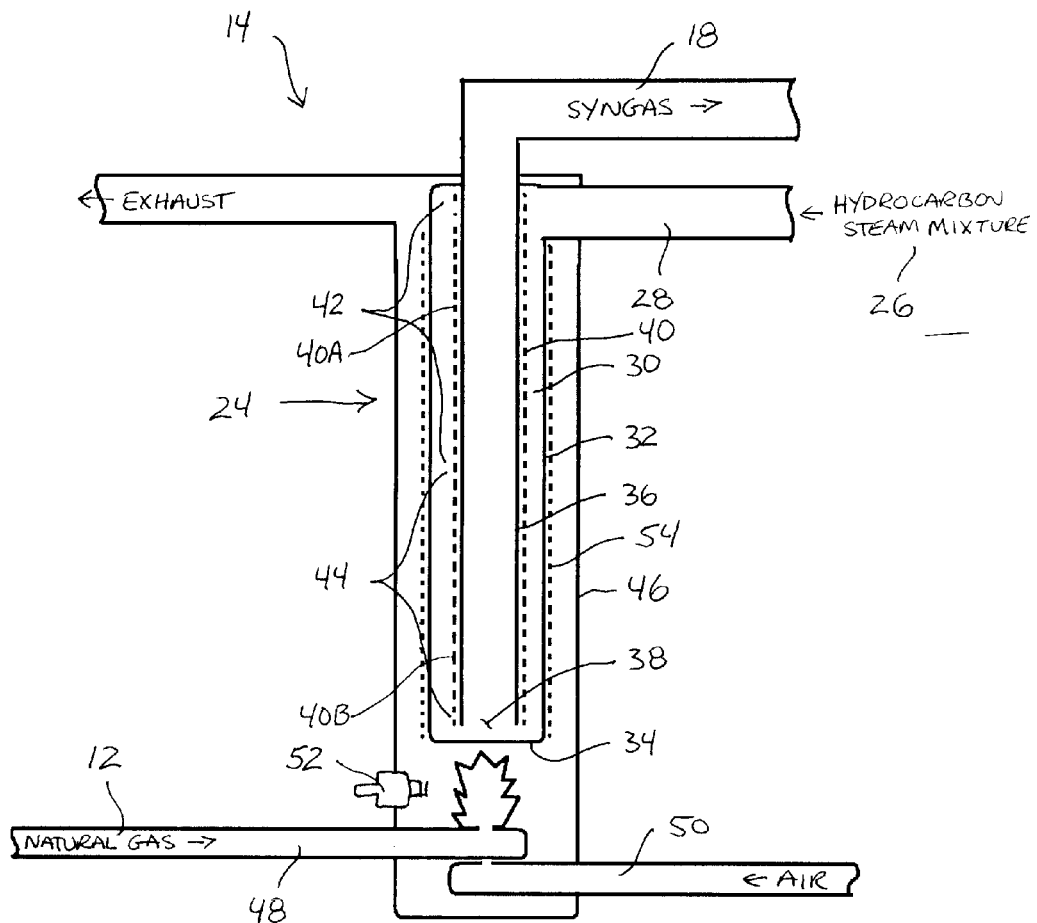
FIG. 2 shows the structure of an exemplary reaction cell used by a syngas reformer.

Referring to FIG. 2 in conjunction with FIG. 1, the internal structure of the syngas reformer 14 can best be explained. Within the syngas reformer 14 are a multitude of reaction cells 24. Since all the reaction cells 24 function in the same manner, a single reaction cell 24 is shown for the purpose of simplicity and clarity.

The natural gas 12 from the well 10 is mixed with water steam 16 to produce a hydrocarbon/steam mixture 26. The hydrocarbon/steam mixture 26 is fed to each of the reaction cells 24.

Each reaction cell 24 contains a supply manifold 28. The supply manifold 28 receives the hydrocarbon/steam mixture 26. The supply manifold 28 supplies syngas to a micro-channel reaction gap 30. The micro-channel reaction gap 30 is created by the space between two concentric tubes 32, 36. The outer tube is a confinement tube 32. The confinement tube 32 has a closed bottom end 34. The top of the confinement tube 32 is open to the supply manifold 28. As such, the hydrocarbon/steam mixture 26 enters the confinement tube 32 from the supply manifold 28.

A center tube 36 is concentrically positioned within the confinement tube 32. The center tube 36 has an open bottom 38. The confinement tube 32 has an inside diameter that is only slightly larger than the outside diameter of the center tube 36. Consequently, the micro-channel reaction gap 30 is formed between the interior of the confinement tube 32 and the exterior of the center tube 36. The micro-channel reaction gap 30 is very small, preferably being no larger than 5000 microns. However, a micro-channel reaction gap 30 of between 100 microns and 1000 microns is preferred. In such a confined space, the steam molecules and the hydrocarbon molecules are forced to interact, thereby inducing a highly efficient water gas shift reaction.

The open bottom 38 of the center tube 36 does not touch the bottom of the confinement tube 32. As such, gases in the micro-channel reaction gap 30 can exit the reaction cell 24 through the middle of the center tube 36. The length of the micro-channel reaction gap 30 is equivalent to the overlap between the center tube 36 and the confinement tube 32. This length is preferably between eight centimeters and thirty centimeters.

At least one catalyst 40 is present within the micro-channel reaction gap 30. The catalysts is introduced into the micro-channel reaction gap 30 by coating the exterior of the center tube 36 and/or the interior of the confinement tube 32 with the catalyst 40. Depending upon the length of the micro-channel reaction gap 30, the width of the micro-channel reaction gap 30 and the flow rate of the hydrocarbon/steam mixture 26, more than one segment of catalyst can be present within the micro-channel reaction gap 30. For instance, suppose that the top half 42 of the micro-channel reaction gap 30 is filled with a first catalyst 40A, that promotes the water gas shift reaction between the hydrocarbon and steam. Passage of the hydrocarbon/gas mixture 26 through the top half 42 of the micro-channel reaction gap 30 may be all that is necessary to exhaust the water gas shift reaction. Consequently, the gases moving through the bottom half 44 of the micro-channel reaction gap 30 are syngas. The catalyst 40B present in the bottom half 44 of the micro-channel reaction gap 30 can be a cobalt alloy to help begin the Fischer-Tropsch transformation of the syngas 18 to a readily liquefiable hydrocarbon.

Each reaction cell 24 within the syngas reformer 14 is heated by combustion. The fuel used for combustion can be the raw natural gas 12. Each confinement tube 32 is surrounded by a confined combustion chamber 46. The confined combustion chamber 46 is preferably a tube concentrically positioned around the confinement tube 32, however other shaped combustion tubes can be used.

A combustion gas supply manifold 48 provides combustible gas into each combustion chamber 46. Likewise, an air supply manifold 50 supplies air into each combustion chamber 46. A combustion catalyst 54 may be present on the exterior of the confinement tube 32 to cause the combustion gas to ignite in the presence of air at the operating temperature of the reaction cell 24. For low temperature start-up conditions, a spark plug 52 may be provided to initiate combustion. The combustion catalyst 54 is preferably present along the length of the confinement tube 32. In this way, combustion can be distributed along the length of the combustion chamber 46, thereby ensuring a fairly even heat distribution within the confinement tube 32.

In operation, the combustion gas is burned inside the combustion chamber 46. Using the heat from the combustion, the reaction cell 24 is brought to an operating temperature of between 450° C. and 700° C. The hydrocarbon/steam mixture 26 is introduced into the micro-channel reaction gap 30. The hydrocarbon gas and steam, as assisted by the catalyst 40, undergo a water gas shift reaction to produce syngas 18. The syngas 18 is then drawn out of the reaction cell 24 through the center tube 36. Using multiple reaction cells 24, a very large volume of natural gas can be converted into syngas 18 in a small amount of space using relatively inexpensive components.

It has already been mentioned that the syngas 18 produced by each reaction cell 24 also undergoes the Fischer-Tropsch process within that same reaction cell 24 by providing the appropriate catalysts within the reaction cell. Alternatively, the syngas 18 can be sent from the syngas reformer 14 into a Fischer-Tropsch reformer 20. In FIG. 1, the Fischer-Tropsch reformer 20 is shown as a separate unit from the syngas reformer 14. This need not be the case. As will become clear, both the Fischer-Tropsch reformer 20 and the syngas reformer 14 use nearly identical reaction cells. The reaction cells can be configured into a single unit.

Figure 3:
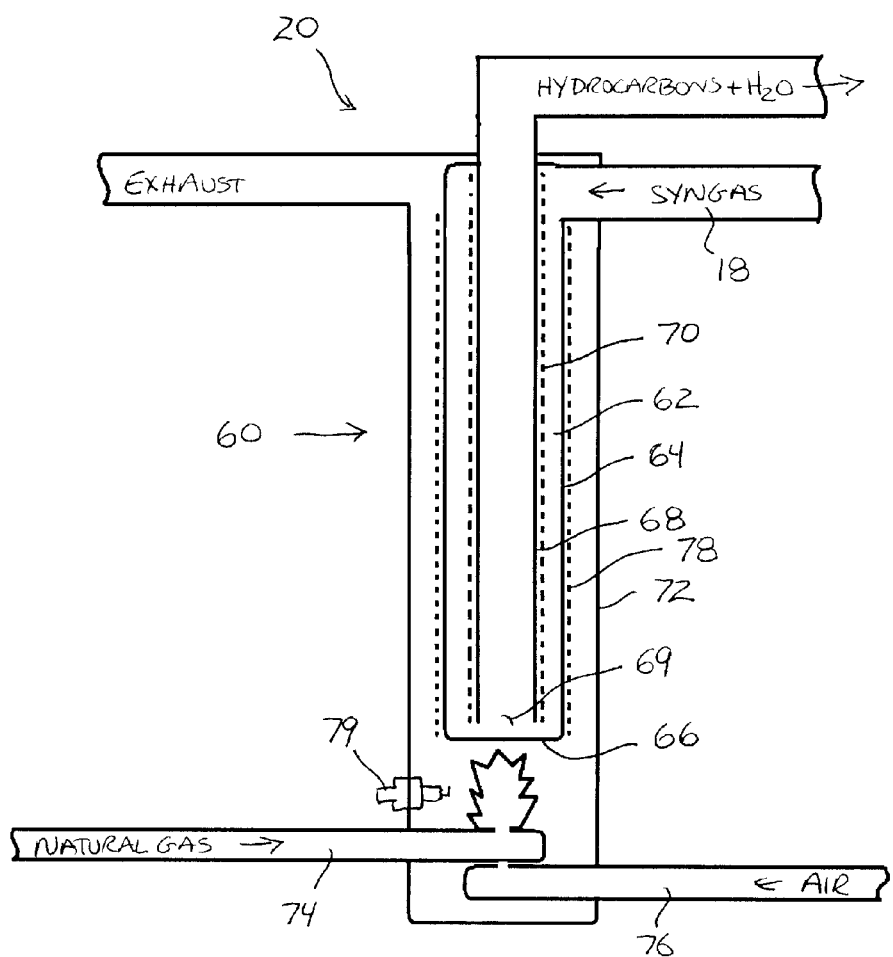
FIG. 3 shows the structure of an exemplary reaction cell used by a Fischer-Tropsch reformer.

Referring to FIG. 3 in conjunction with FIG. 1, it can be seen that the Fischer-Tropsch reformer 20 can have a physical structure nearly identical to that of the syngas reformer of FIG. 2. The only difference is the catalysts used within the reformer 20 and perhaps a change in operational temperature that better suits the Fischer-Tropsch process. The Fischer-Tropsch reformer 20 contains a multitude of reaction cells 60. Each reaction cell 60 receives syngas 18 from the syngas reformer 14. Within the reaction cell 60, a micro-channel reaction gap 62 is created between two concentric tubes. The outer tube is a confinement tube 64. The confinement tube 64 has a closed bottom end 66.

A center tube 68 is concentrically positioned within the confinement tube 64. The center tube 68 has an open bottom 69. The confinement tube 64 has an inside diameter that is only slightly larger than the outside diameter of the center tube 68. Consequently, the micro-channel reaction gap 62 exists between the interior of the confinement tube 64 and the exterior of the center tube 68. The micro-channel reaction gap 62 is very small, preferably being no larger than 5000 microns. However, a micro-channel reaction gap 62 of between 100 microns and 1000 microns is preferred. In such a confined space, the carbon monoxide and the hydrogen contained within the syngas 18 are forced to interact, thereby inducing a highly efficient Fischer-Tropsch reaction.

The open bottom 69 of the center tube 68 does not touch the bottom of the confinement tube 64. As such, gases in the micro-channel reaction gap 62 can exit the reaction cell through the middle of the center tube 68. The length of the micro-channel reaction gap 62 is equivalent to the overlap between the center tube 68 and the confinement tube 64. This length is preferably between eight centimeters and thirty centimeters in length.

At least one catalyst 70 is present within the micro-channel reaction gap 62. The catalyst 70 is introduced into the micro-channel reaction gap 62 by coating the exterior of the center tube 68 and/or the interior of the confinement tube 64 with the catalyst 70. An example of a catalyst that promotes the Fischer-Tropsch reaction is cobalt and various alloys of cobalt.

Each reaction cell 60 within the Fischer-Tropsch reformer 20 is heated by combustion. The fuel used for combustion can be the raw natural gas. Each confinement tube 64 is surrounded by a confined combustion chamber 72. The confined combustion chamber 72 is preferably a tube concentrically positioned around the confinement tube 64, however other shaped combustion tubes can be used.

A combustion gas supply manifold 74 provides combustible gas into each combustion chamber 72. Likewise, an air supply manifold 76 provides air into each combustion chamber 72. A combustion catalyst 78 may be present on the exterior of the confinement tube 64 to cause the combustion gas to ignite in the presence of air at the operating temperature of the reaction cell 60. For low temperature start-up conditions, a spark plug 79 may be provided to initiate combustion. The combustion catalyst 78 is preferably present along the length of the confinement tube 64. In this way, combustion can be distributed along the length of the combustion chamber 72, thereby ensuring a fairly even heat distribution within the confinement tube 64.

As has been indicated by Equation II previously presented, the by-products of the Fischer-Tropsch reformer 20 are water 16 and complex hydrocarbons 22. The water 16 and hydrocarbons 22 are cooled to under 100° C. so that the water 16 condenses and separates from the hydrocarbons 22. The water 16 can be recycled into the system. The hydrocarbons 22 are further cooled and/or pressurized until liquidification occurs. The liquefied hydrocarbons can then be stored and transported.

It will be understood that the embodiment of the reaction cells and the overall system is merely exemplary and that a person skilled in the art can make many changes using functionally equivalent configurations. For instance, in both embodiments of the reaction cell, gas is burned under the confinement tube. It will be understood that depending upon the orientation of the reaction cell, combustion can be initiated at the side or even at the top of the confinement tube. What is important is that the combustion evenly heats the exterior of the confinement tube.

Furthermore, in both the syngas reformer and the Fischer-Tropsch reformer, the gas exiting the micro-channel reaction gap is drawn through the center tube.

The direction of flow can be reversed. As such, it will be understood that gases may enter the micro-channel reaction gaps through the center tube. All such variations, modifications, and alternate embodiments are intended to be included within the present invention as defined by the claims.

What is claimed is:

1. A method of processing natural gas, comprising the steps of:
providing a plurality of reaction cells, wherein each reaction cell contains two concentric tubes having a gap space interposed between said concentric tubes;
heating said plurality of reaction cells;
mixing natural gas and steam to form a mixture;
passing said mixture into said gap space of at least some of said plurality of reaction cells, wherein said mixture undergoes a water gas shift reaction to produce syngas.

2. The method according to claim 1, further including the step of passing said syngas into at least some of said plurality of reaction cells, wherein said syngas undergoes a Fischer-Tropsch reaction to produce complex hydrocarbons and water.

3. The method according to claim 1, wherein said gap space is less than 5000 microns in width.

4. The method according to claim 1, wherein each said gap space is less than 1000 microns in width.

5. The method according to claim 1, wherein said plurality of reaction cells are heated by burning some of said natural gas.

6. The method according to claim 1, further including the step of providing at least one catalyst in each said gap space.

7. The method according to claim 1, further including the step of providing different catalysts in different sections of each said gap space.

8. The method according to claim 1, wherein said two concentric tubes include an inner tube and an outer tube.

9. The method according to claim 8, further including the step of drawing said syngas out of each of said reaction cells through said inner tube.

10. The method according to claim 9, further including the step of drawings said syngas out of each of said reaction cells through said outer tube.

11. A method of converting natural gas into syngas, comprising the steps of:
providing a plurality of reaction cells, wherein each reaction cell contains two concentric tubes having a gap space interposed between said concentric tubes;
heating said plurality of reaction cells;
forming a mixture from natural gas and steam;
passing said mixture into said gap space of at least some of said plurality of reaction cells, wherein said mixture undergoes a water gas shift reaction to produce syngas.

12. The method according to claim 11, wherein each said gap space is less than 1000 microns in width.

13. The method according to claim 11, wherein said plurality of reaction cells are heated by burning some of said natural gas.

14. The method according to claim 11, further including the step of providing at least one catalyst in each said gap space.

15. A method of converting syngas gas into a complex hydrocarbon, comprising the steps of:
providing a plurality of reaction cells, wherein each reaction cell contains two concentric tubes having a gap space interposed between said concentric tubes;
heating said plurality of reaction cells;
passing syngas into said gap space of said plurality of reaction cells, wherein said syngas undergoes a Fischer-Tropsch transformation to produce complex hydrocarbons.

16. The method according to claim 15, wherein each said gap space is less than 1000 microns in width.

17. The method according to claim 15, wherein said plurality of reaction cells is heated by burning some of said natural gas.

18. The method according to claim 15, further including the step of providing at least one catalyst in each said gap space.

* * * * *